(12) United States Patent
Tavernier et al.

(10) Patent No.: US 11,349,729 B2
(45) Date of Patent: May 31, 2022

(54) NETWORK SERVICE REQUESTS

(71) Applicants: Koninklijke KPN N.V., Rotterdam (NL); IMEC VZW, Leuven (BE); Universiteit Gent, Ghent (BE)

(72) Inventors: Wouter Tavernier, Bruges (BE); Didier Colle, Gentbrugge (BE)

(73) Assignees: KONINKLIJKE KPN N.V., Rotterdam (NL); IMEC VZW, Leuven (BE); UNIVERSITEIT GENT, Ghent (BE)

( * ) Notice: Subject to any disclaimer, the term of this patent is extended or adjusted under 35 U.S.C. 154(b) by 153 days.

(21) Appl. No.: 16/066,279

(22) PCT Filed: Dec. 30, 2016

(86) PCT No.: PCT/EP2016/082908
§ 371 (c)(1),
(2) Date: Jun. 26, 2018

(87) PCT Pub. No.: WO2017/114944
PCT Pub. Date: Jul. 6, 2017

(65) Prior Publication Data
US 2019/0207827 A1    Jul. 4, 2019

(30) Foreign Application Priority Data

Dec. 30, 2015 (EP) ..................................... 15203077
Dec. 30, 2015 (EP) ..................................... 15203103

(51) Int. Cl.
*G06F 15/173* (2006.01)
*H04L 41/5051* (2022.01)
(Continued)

(52) U.S. Cl.
CPC ...... *H04L 41/5051* (2013.01); *H04L 41/0896* (2013.01); *H04L 41/5019* (2013.01); *H04L 47/826* (2013.01); *H04L 47/72* (2013.01)

(58) Field of Classification Search
CPC ............ H04L 41/0896; H04L 41/5019; H04L 41/5051; H04L 47/72; H04L 47/826
(Continued)

(56) References Cited

U.S. PATENT DOCUMENTS

| 2003/0236854 A1 | 12/2003 | Rom et al. |
| 2008/0225889 A1 | 9/2008 | Truong et al. |

(Continued)

FOREIGN PATENT DOCUMENTS

| EP | 2026532 A1 | 2/2009 |
| EP | 2199910 A1 | 6/2010 |

(Continued)

OTHER PUBLICATIONS

Notification of Transmittal of International Search Report and Written Opinion for Int'l Application No. PCT/EP2016/082908, titled: Network Service Requests, dated Jan. 23, 2017.

(Continued)

*Primary Examiner* — Karen C Tang
(74) *Attorney, Agent, or Firm* — Hamilton, Brook, Smith & Reynolds, P.C.

(57) ABSTRACT

An enhancement device (10, 116) for enhancing service requests (120) and a method of allocating network resources to a network service in a communication network is provided. The communication network comprises network resources capable of providing a network service specified in a service request issued by a client. The service request (120) comprises a direct part (121) and an indirect part (122), while the indirect part comprises at least one allocation condition. The method comprises unconditionally allocating, in response to the direct part (121) of the service request, one or more network resources to the network service, and conditionally allocating, in response to the indirect part (122) of the service request, one or more (Continued)

additional network resources to the network service, wherein conditionally allocated network resources are capable of being unconditionally allocated to the network service in response to the direct part of a further service request of the client and are available for allocation to another network service depending on the at least one allocation condition.

15 Claims, 10 Drawing Sheets

(51) Int. Cl.
*H04L 47/70* (2022.01)
*H04L 41/0896* (2022.01)
*H04L 41/5019* (2022.01)
*G06F 15/16* (2006.01)
*H04L 47/72* (2022.01)

(58) Field of Classification Search
USPC .................................................. 709/224, 226
See application file for complete search history.

(56) References Cited

U.S. PATENT DOCUMENTS

| | | | |
|---|---|---|---|
| 2011/0171938 A1 | 7/2011 | Daugherty et al. | |
| 2011/0231853 A1* | 9/2011 | Murray | H04L 41/00 718/103 |
| 2013/0282149 A1* | 10/2013 | Kuntagod | H04L 67/125 700/73 |
| 2013/0304903 A1* | 11/2013 | Mick | H04L 67/16 709/224 |
| 2014/0122695 A1* | 5/2014 | Kulikov | H04L 41/5054 709/224 |
| 2016/0179562 A1* | 6/2016 | Kaneko | G06F 9/45558 |
| 2016/0277315 A1* | 9/2016 | Miller | G06F 16/9537 |
| 2018/0217951 A1* | 8/2018 | Benisty | G06F 13/1642 |

FOREIGN PATENT DOCUMENTS

| | | |
|---|---|---|
| EP | 2326060 A1 | 5/2011 |
| EP | 2940968 A1 | 11/2015 |
| WO | 2005/074198 A1 | 8/2005 |

OTHER PUBLICATIONS

Extended European Search Report for European Application No. 15203077.1, titled: Network Service Requests, dated Mar. 9, 2016.
ETSI Group Specification "Network Function Virtualization (NFV) Management and Orchestration" (ETSI GS NFV-MAN 001 V1.1., see http://www.etsi.org/deliver/etsi_gs/NFV-MAN/001_099/001/01.01.01_60/gs_nfv-man001v010101p.pdf (2014).
M. Chiosi, D., et al. "Network Functions Virtualisation (NFV)—An Introduction, Benefits, Enablers, Challenges & Call for Action." presented at SDN and OpenFlow World Congress, Darmstadt-Germany, pp. 1-16 (Oct. 22-24, 2012).
M. Chiosi, D., et al. "Network Functions Virtualisation (NFV)—Network Operator Perspectives on Industry Progress." presented at the SDN and OpenFlow World Congress, Frankfurt-Germany, pp. 1-16, (Oct. 15-17, 2013).
P. Quinn, et al., "Service Function Chaining Problem Statement." Network Working Group, IETF Internet Draft, pp. 1-19 (Aug. 11, 2014).
Open Networking Foundation, Open Flow Switch Specification, retrieved from the internet: https://www.opennetworking.org/sdn-resources/onf-specifications/openflow; (Mar. 26, 2015).
Foster, Ian, et al. "A distributed resource management architecture that supports advance reservations and co-allocation." Quality of Service. IWQoS'99. 1999 Seventh International Workshop on. IEEE, (1999).
Curino, C., et al. "Reservation-based Scheduling: If You're Late Don't Blame Us!," In Proceedings of the ACM Symposium on Cloud Computing (pp. 1-14). ACM. (Nov. 2014).
Biswas, A., *et al.*, "Predictive Auto-scaling Techniques for Clouds Subjected to Requests with Service Level Agreements," In Services (SERVICES), 2015 IEEE World Congress on (pp. 311-318). IEEE (Jun. 2015).
ETSI GS NFV 002, V1.2.1, Group Specification: Network Functions Virtualization (NFV) Architectural Framework (Dec. 2014).
ETSI GS NFV-MAN 001, V0.6.1, Group Specification: Network Function Virtualization (NFV), *draft*, Management and Orchestration, (Jul. 2014).

* cited by examiner

NETWORK SERVICE REQUESTS

This application is the U.S. National Stage of International Application No. PCT/EP2016/082908, filed on Dec. 30, 2016, which designates the U.S., published in English, and claims priority under 35 U.S.C. § 119 or 365(c) to EP Application No. 15203077.1, filed on Dec. 30, 2015 and EP Application No. 15203103.5, filed on Dec. 30, 2015. The entire teachings of the above applications are incorporated herein by reference.

FIELD OF THE INVENTION

The present invention relates to network service requests. More in particular, the present invention relates to enhancing service request and to allocating network resources in a communication network in response to service requests.

BACKGROUND OF THE INVENTION

It is well known to use service requests in communication networks and to allocate network resources in response to service requests. A client may issue a service request specifying a service, and a service provider may allocate the network resources required for offering the requested service. Typically, allocated network resources are exclusively made available for the requested service and are not available for other services.

Service requests requiring the allocation of network resources are also used in communication networks which provide telecom services through chains of virtualized network functions (VNFs), also known as service chains or virtual network forwarding graphs. These are highly technical descriptions of the service, often using a specialized programming language such as XML or YANG. In response to service requests, networks can provide network functions by utilizing VNFs and by allocating network resources and computing resources accordingly.

In practice, several problems may arise when allocating service requests. When a service request is incomplete or vague (that is, when the system cannot unambiguously interpret the service request), the system either rejects the entire service request or rejects the incomplete part. When the entire service request is rejected, the service will not be provided. When the incomplete part is rejected, the service will not be carried out according to the wishes of the customer. Instead, a default version of the service will be carried out.

It is difficult for many clients to define a desired network service at a high level of precision or completeness, and also to describe it correctly in a machine-readable service request. In addition, clients may define a desired network service incorrectly or request more resources than necessary. For a certain gaming service, a client may claim a latency of 20 ms, while a latency of 50 ms would also be acceptable for the particular gaming service. As a result of incorrect definitions, network resources are not used in an efficient manner.

Another problem that may arise is that the demand of a service is often not known beforehand. In other words, when a client issues the service request it is often not known how many (or to what extent) network resources will be required. In addition, when the network service is being provided, demand for the service may increase and more network resources may be needed. However, the original allocation of network resources may make the addition of network resources to the same service inefficient or even impossible.

SUMMARY OF THE INVENTION

It is a first object of the present invention to solve these problems by providing an enhancement device for enhancing service requests in a communication network, wherein the communication network comprises network resources capable of providing network services in response to service requests, and wherein a service request comprises at least one identification and at least one service property, which device comprises:

an identification detection unit configured for detecting the at least one identification of the service request, a properties determination unit configured for determining the at least one service property of the service request, a retrieval unit for retrieving, by using the at least one identification of the service request, service properties from a storage unit, a comparison unit for carrying out a comparison between the at least one determined service property and retrieved service properties, and a modification unit for modifying, in response to the comparison, the at least one service property of the service request.

By providing an identification detection unit, an identification can be used to enhance the service request in a specific manner, in dependence on the identification. The identification may relate to, for example, the client that issued the service request, thus allowing client-specific enhancements.

By providing a properties determination unit, one or more properties of the service request can be examined, for example for comparison purposes.

By providing a retrieval unit, service properties can be retrieved from a storage unit which may, for example, store statistical data concerning some or all service request properties.

By providing a comparison unit, service properties determined in the service request and service properties retrieved from storage may be compared.

By providing a modification unit, service properties of the service request may be modified in response to the comparison. That is, the results of the comparison can be used to modify properties of the service request, if modifying is required or desired.

The service request enhancement device of the invention allows an identification-specified comparison of properties of the service request with corresponding, stored properties. In addition, the service enhancement device of the invention allows the properties of the service request to be modified, dependent on the results of the comparison. If a property of a service request is identical to a corresponding stored (that is, reference) property, no modification may be required. However, if there is a discrepancy between a property of a service request and the corresponding stored property, modification may be required.

A property of a service request may be, for example, a latency, a bandwidth, a response time, an amount of memory, a quality of service (QoS) level, or any other relevant property.

Modification of a property may comprise substituting a property of a service request with a modified version of the property, or by adding data to the property. In some cases, a "null" modification can be appropriate, in which the property is effectively not modified. In other cases, adding data may include adding data related to future use, or to potential future use.

In an embodiment, the identification is at least one of:
a client identification identifying a client which issued the service request,
an application identification identifying an application to be activated by the network service specified in the service request,
a service identification identifying a service to be provided by the network in response to the service request,
a time identification (such as a time stamp) identifying the time at which the service request is received,
a device identification identifying a device involved in the requested service, and
a network identification identifying a network which is involved in providing the network service specified in the service request.

A service request may contain a single identification, such as a client identification, but will typically comprise two or more identifications, for example both a client identification and an application identification.

In an embodiment, the enhancement device further comprises a syntax checking unit for checking the syntax of a service request. Checking the syntax of a service request offers a simple and quick mechanism to determine whether a service request can be interpreted.

In an embodiment, the enhancement device further comprises a policy checking unit for checking whether a service request complies with one or more policies. A check for policy compliance, offers an additional mechanism of checking whether a service request will be interpreted correctly, from the viewpoint of the network service provider.

The enhancement device of the present invention intelligently adds information to a service request, before the service request enters the system.

The invention also provides a system for allocating service requests in a communication network, the system comprising:
an enhancement device as described above,
a storage unit comprising service properties, and
an allocation system for allocating network resources to a network service in a communication network, the allocation system being configured for receiving and processing service requests enhanced by the enhancement device.

The invention further provides a method of enhancing service requests in a communication network, wherein the communication network comprises network resources capable of providing network services in response to service requests, and wherein a service requests comprises at least one identification and at least one service property, which method comprises:
detecting the at least one identification of the service request,
determining the at least one property of the service request,
retrieving, by using at least one identification of the service request, service properties from a storage unit,
comparing determined service properties and retrieved service properties, and
modifying, in response to the comparing, service properties of the service request.

The identification may be at least one of:
a client identification identifying a client which issued the service request,
an application identification identifying an application to be activated by the network service specified in the service request,
a service identification,
a time identification,
a device identification, and
a network identification identifying a network which is involved in providing the network service specified in the network request.

The method offers the same advantages as the enhancement device discussed above.

The method may further comprise checking the syntax of a service request. Syntax checking, which may be carried out before other steps of a method, offers a simple and quick mechanism to determine whether a service request can be interpreted.

The method may still further comprising checking whether a service request complies with one or more policies. A check for policy compliance, which may be carried out after one or more other checks, offers an additional mechanism of checking whether a service request will be interpreted correctly, from the viewpoint of the network service provider.

The invention still further provides a software program product containing instructions allowing a processor to carry out the method described above. The software program product may be stored on a tangible carrier, such as a DVD or a USB stick. Alternatively, the software program product may be stored on a server from which it may be downloaded using the Internet. The software program product contains software instructions which can be carried out by the processor of a device, such as a server, a user device (for example a smartphone), and/or a monitoring device.

It is a second object of the present invention to solve these problems by providing a method of allocating network resources to a network service in a communication network, wherein the communication network comprises network resources capable of providing a network service specified in a service request issued by a client, wherein the service request comprises a direct part and an indirect part, and wherein the indirect part comprises at least one allocation condition, the method comprising:
unconditionally allocating, in response to the direct part of the service request, one or more network resources to the network service, wherein unconditionally allocated network resources are prevented from being unconditionally or conditionally allocated to another network service, and
conditionally allocating, in response to the indirect part of the service request, one or more additional network resources to the network service, wherein conditionally allocated network resources are capable of being unconditionally allocated to the network service in response to the direct part of a further service request of the client and are available for allocation to another network service depending on the at least one allocation condition.

By providing a service request comprising two parts, a direct part and indirect part, it becomes possible to distinguish between a part of the service request that has to be implemented directly, and another part of the service requests that may have to be implemented in the future, depending on a condition. In response to the direct part of the service request, one or more network resources are allocated to the network service directly, that is, unconditionally. In response to the indirect part of the service request, however, one or more additional network resources are conditionally allocated. The conditional allocation can be converted into an unconditional allocation, for instance in response to the direct part of a further service request. The conditionally allocated network resources are available to other network services depending on the at least one allocation condition. That is, if a certain condition is not fulfilled, the conditional allocation of the network resources may be cancelled, thus making these network resource service available for allocation to other services.

It can thus be seen that the method of the present invention allows a flexible allocation of network resources by making part of that allocation conditional. The flexible allocation, in turn, makes scaling of the network service very simple and efficient, as network resources that may only be needed in the future can already be specified in the original service request.

It is noted that the client may be a network service provider, an application provider, another communication network or an end user device. It is further noted that an unconditional allocation makes the network resources concerned ready for use, while a conditional allocation may only imply reserving those network resources.

In an embodiment, the allocation condition comprises a time limit. That is, the conditional allocation of the network resources may be cancelled if those resources are not unconditionally allocated within a certain time limit. Additionally, or alternatively, the conditional allocation of the network resources may be cancelled if another condition is not fulfilled within a certain time limit. Imposing a time limit ensures that conditionally allocated network resources cannot be claimed indefinitely and will be made available for other services at a certain point in time. It can thus be seen that in this embodiment the conditional allocation is limited in time. The method of the invention may therefore further comprise allowing conditionally allocated network resources to be unconditionally or conditionally allocated to another network service after the time limit has expired.

Instead of, or in addition to a time limit, other allocation conditions may be used. In an embodiment, the allocation condition comprises a threshold value. A conditional allocation may be converted into an unconditional allocation when the threshold value is exceeded. The value the threshold value is compared with, for example, the data volume or the number of users. This allows the conditional allocation of network resources to be made unconditional when, for example, the number of users of a network service exceeds the threshold value. The method of the invention may therefore comprise unconditionally allocating conditionally allocated network resources to the network service if the threshold value is exceeded.

The method of the invention may further comprise unconditionally allocating, in response to the direct part of the further service request received from the client, conditionally allocated network resources to the network service. That is, irrespective of any condition (such as a time limit) a conditional allocation may be made unconditional by issuing a further service request specifying the conversion into an unconditional allocation in its direct part.

Conversely, the method of the invention may further comprise cancelling a conditional allocation in response to the direct part or the indirect part of a still further service request of the client. The direct part of a still further service request of the same client may contain an instruction to cancel the conditional allocation. It is also possible to cancel the conditional allocation in response to the indirect part of a still further service request of the same client. That is, if the same client conditionally allocates network resources to another service, the conditional allocation of network resources required for the other service may be cancelled, for example by referring to the conditionally allocated network resources of the other service.

In an advantageous further embodiment of the invention, the indirect part of a service request further comprises a likelihood of conditionally allocated network resources being unconditionally allocated within the time limit. By using a likelihood of the conditional allocation of network resources being converted into an unconditional allocation, it is possible to prioritize allocations and to decide, in certain cases, whether network resources should be allocated to one network service or the other. More in particular, in an embodiment conditionally allocating additional network resources comprises determining an actual number and/or amount of network resources (such as virtual machines and/or bandwidth) to be conditionally allocated in dependence of the likelihood.

Embodiments of the methods may advantageously further comprise providing the client with identifiers referring to conditionally allocated network resources. Such identifiers allow conditionally allocated network resources to be easily identified. Identifiers may facilitate the resource orchestration process by matching conditionally allocated resources when the client later converts its conditional allocation into an unconditional allocation. Such identifiers may also facilitate comparing likelihoods, time limits or other allocation conditions.

In some embodiments, conditionally allocated network resources are prevented from being unconditionally allocated or conditionally allocated to another network service. That is, conditionally allocated network resources can, in such embodiments, only be unconditionally allocated to the same network service, or be made available by the same network service.

In an embodiment, the actual number of network resources to be conditionally allocated is smaller than the number of network resources requested in the indirect part. In such an embodiment, fewer network resources are conditionally allocated than are requested. The difference between the requested number of network resources and the conditionally allocated number may be determined by likelihoods, conditions, the availability of network resources, and/or other factors. In other embodiments, the amount of conditionally allocated network resources may be equal to the number of network resources specified in the indirect part of the service request, possibly subject to availability.

In some embodiments using time limits, the time limits of conditional allocations of a resource may be compared to decide which conditional allocation has priority. In some cases, priority may be given to a conditional allocation having a time limit which is to expire soon, when compared with a conditional allocation (of the same network resource) having a time limit further in the future. This allows an efficient use of network resources by conditionally allocating those network resources to services which require them in the short term while possibly allocating the same network resources later to services which will require their use in the long term.

The invention additionally provides a software program product comprising instructions allowing a processor to carry out the method described above. The software program product may include a tangible carrier, such as a DVD or a USB stick. Alternatively, the software program product may be stored on a server from which it may be downloaded using the Internet. The software program product contains software instructions which can be carried out by the processor of a device, such as a server, a user device (for example a smartphone), and/or a monitoring device.

The invention further provides a device for allocating network resources to a service in a communication network, wherein the communication network comprises network resources capable of providing network services specified in a service request issued by a client, wherein the service request comprises a direct part and an indirect part, and wherein the indirect part comprises at least one allocation condition, the device being configured for unconditionally allocating, in response to the direct part of the service request, one or more network resources to the network service, wherein unconditionally allocated network resources are prevented from being unconditionally or conditionally allocated to another network service, and conditionally allocating, in response to the indirect part of the service request, one or more additional network resources to the network service, wherein conditionally allocated network resources are capable of being unconditionally allocated to the network service in response to the direct part of a further service request of the client and are available for allocation to another network service depending on the at least one allocation condition.

The invention yet further provides a communication system comprising a communication network, an allocation device as described above, and optionally a service request modification device configured for modifying the indirect part of the service request. In the communication system of the invention, the network resources may comprise virtual machines or bandwidth, but preferably a combination of virtual machines and bandwidth.

It is noted that the invention relates to all possible combinations of features recited in the claims.

BRIEF DESCRIPTION OF THE DRAWINGS

The present invention will further be explained with reference to exemplary embodiments illustrated in the drawings, in which.

DETAILED DESCRIPTION OF EMBODIMENTS

The present invention allows an improved use of service requests in communication networks, in particular but not exclusively networks utilizing virtual network functions which may be carried out by suitable network resources. The invention makes it possible to modify service requests, if necessary or desired, to better suit the capabilities of the network and/or of the network resource allocation system, and/or to better suit the needs of the clients requesting the network services.

The invention will be explained with reference to telecommunications service provisioning through chains of virtualized network functions (VNFs), also known as service function chains (SFCs) or virtual network function forwarding graphs (VNFFGs). Network function virtualization (NFV) is a concept which decouples network functions from their hardware, thus virtualizing these functions. Using NFV techniques, physical devices can be regarded as resources on which network resources can be dynamically loaded. A service request may therefore be an SFC request, and may be expressed in a language and format required by the network resource allocation system. A service request may alternatively, or additionally, be expressed in, for instance, a natural language, such as the English language.

It is noted that the invention is not limited to NFV-related applications but may also be applied in other environments using service requests or a similar mechanism.

Figure 1:
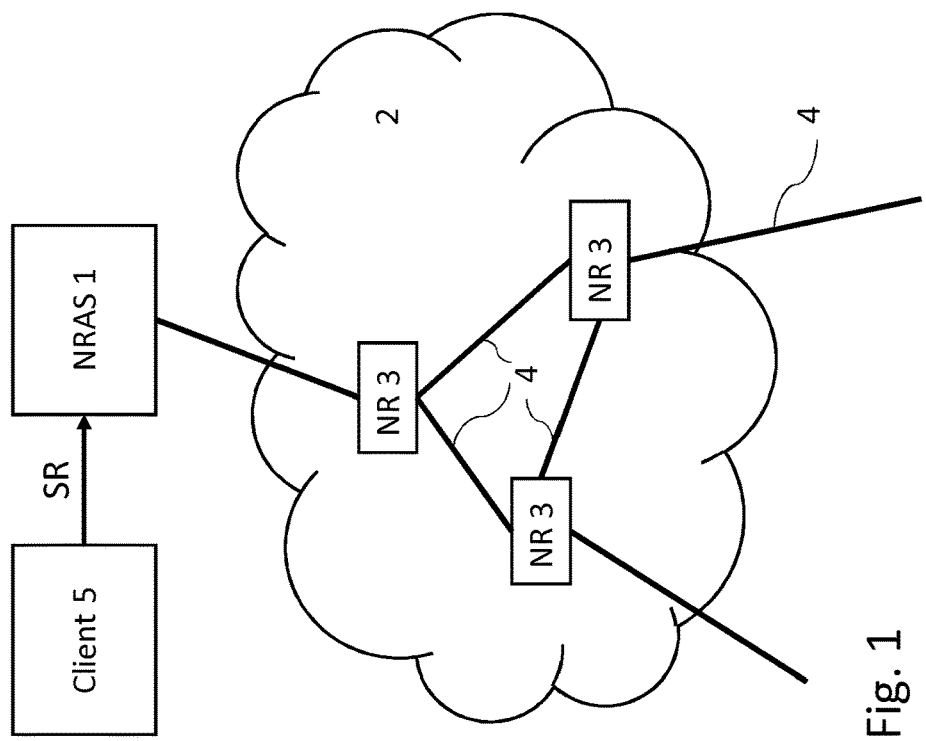
FIG. 1 schematically shows a communication network including network resources, in which communication network the invention may be utilized.

An exemplary network 2 is schematically shown in FIG. 1. The network 2 is shown to comprise network resources (NR) 3 which are connected by suitable (wired or wireless) connections 4. The network resources 3 are capable of providing network services which clients may specify in service requests.

To provide a single network service, one or more network resources 3 may be required. Conversely, a single network resource may provide two or more network services substantially simultaneously. A network resource 3 may be constituted by a suitable processing unit (such as a microprocessor) and an associated memory. Other network resources may be constituted by other network elements, such as transmission lines and switches.

The network 2 is shown to be connected to a network resource allocation system (NRAS) 1 according to the invention. This system is configured to allocate network resources, such as the network resources 3 illustrated in FIG. 1, to a network service, in response to a service request (SR) from a client 5.

Conventional network resource allocation systems only allocate the resources specified in the service request. That is, a conventional network resource allocation system uses the information provided in a service request to allocate network resources to services, using a 1-to-1 translation of the service specified in the service request into allocated network resources. However, it can be shown that this is not efficient. Clients may request higher specifications that needed. In addition, clients may provide ambiguous or incomplete service requests, which typically will not result in network resource allocation using prior art techniques. The invention provides a system for allocating service requests which is more flexible and produces more efficient network resource allocations.

Figure 2:
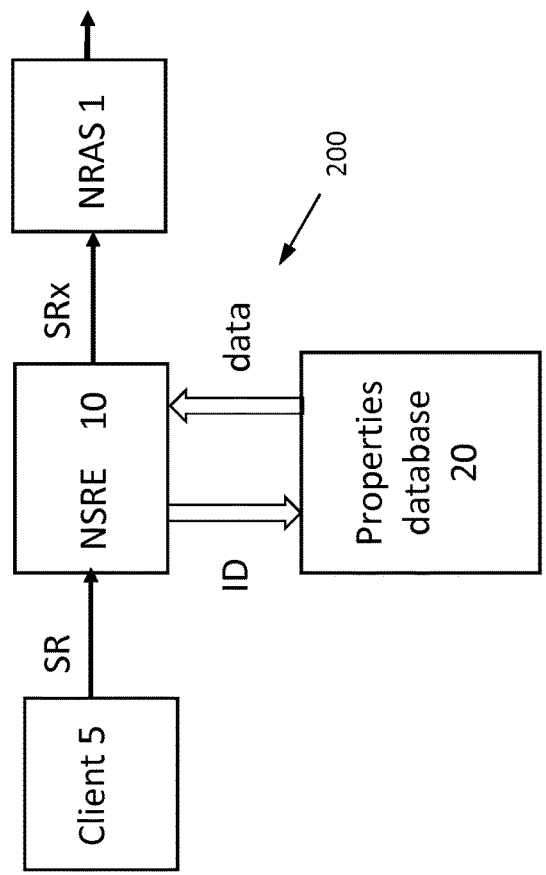
FIG. 2 schematically shows a system for allocating service requests in a communication network according to an embodiment of the invention.

A system 200 for allocating service requests according to the invention is shown in more detail in FIG. 2. A network service request enhancer (NSRE) 10 and a database 20 are arranged between a client 5 and an NRAS 1, which may be the shown in FIG. 1. In the embodiment shown, the NRAS 1 may be a device according to the prior art, as the enhancement function is implemented in the NSRE 10. In other embodiments, however, the NSRE 10 and the NRAS 1 may be a single integrated device, for example. The database 20 is in the embodiment shown a properties database stored in a storage unit, in which properties database properties of network services are stored, as will later be explained in more detail.

As illustrated in FIG. 2, the NSRE 10 receives a service request (SR), for example from the client 5. The NSRE 10 enhances the service request, if possible and desired, and produces an enhanced service request (SRx) which is passed on to the NRAS 1. The enhanced service request SRx is used by the NRAS 1 to allocate network resources (for example network resources 3 illustrated in FIG. 1) to a network service specified in the service request.

Figure 3:
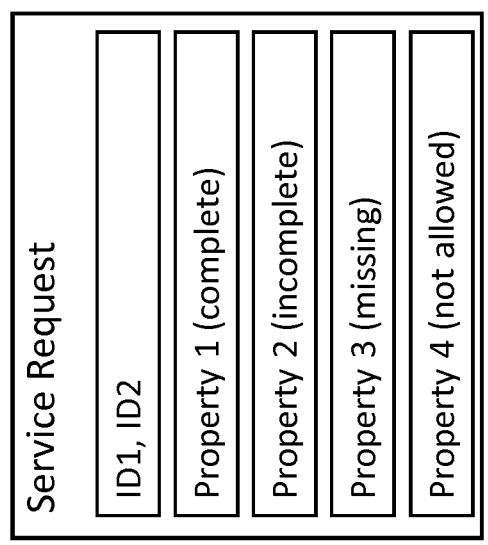
FIG. 3 schematically shows an exemplary service request as may be enhanced in accordance with the invention.

A service request (SR) as may be used in the NSRE 10 of the invention may have a structure as illustrated in FIG. 3. The service request is shown to comprise one or more identifications and one or more properties. The identifications may, for example, comprise a client identification (Client ID) identifying the client that issued the SR, a service identification (service ID) identifying the requested service, a time identification (such as a time stamp, for example), a device identification, and/or other identifications.

The properties of the service request may include, for example, a latency, a bandwidth, a response time, a memory amount, a quality of service (QoS) level, and/or any other relevant property. The NSRE may identify a property as complete, incomplete, missing, or not allowed. The identification not allowed may apply to a property which does not obey a policy rule.

Figure 4:
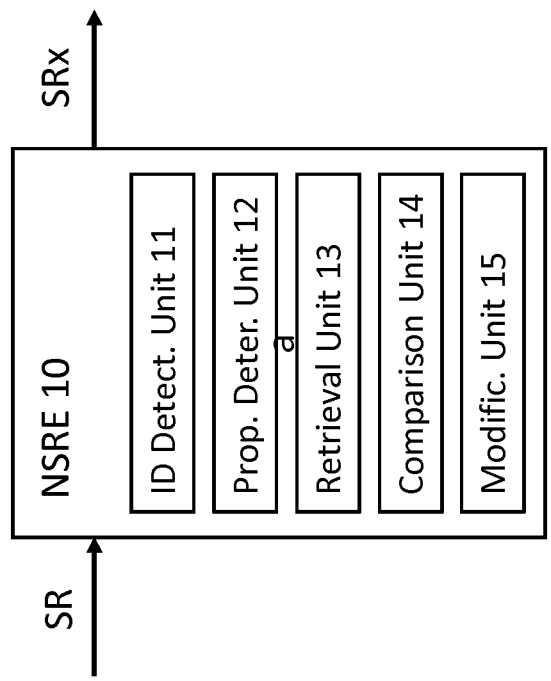
FIG. 4 schematically shows a service request enhancement device in accordance with the invention.

An exemplary embodiment of a network service request enhancement (NSRE) device 10 according to the invention is shown in more detail in FIG. 4. The NSRE device is shown to comprise an identification detection unit 11 configured for detecting the at least one identification of the service request, a properties determination unit 12 configured for determining the at least one property of the service request, a retrieval unit 13 for retrieving, by using the at least one identification of the service request, service properties from a storage unit, a comparison unit 14 for carrying out a comparison between the at least one determined service properties and retrieved service properties, and a modification unit 15 for modifying, in response to the comparison, the at least one service property of the service request.

The NSRE 10 is configured for enhancing service requests using at least one of policy information, service request key word analysis, service request syntax information, information on the completeness of the service request, and/or other information. Policies may include static policies (default configurations of parts of the service request based on customer information, customer type information, network identity, application identity, etc.), dynamic policies (configurations based on the time of receiving the service request and monitoring information received from the MN&O or other monitoring entities in the network), history-based policies (configurations based on interpretation and extrapolation of historic information), and externality-based policies (configurations depending on information from external sources, for instance sources providing planning and forecasting information).

Figure 5:
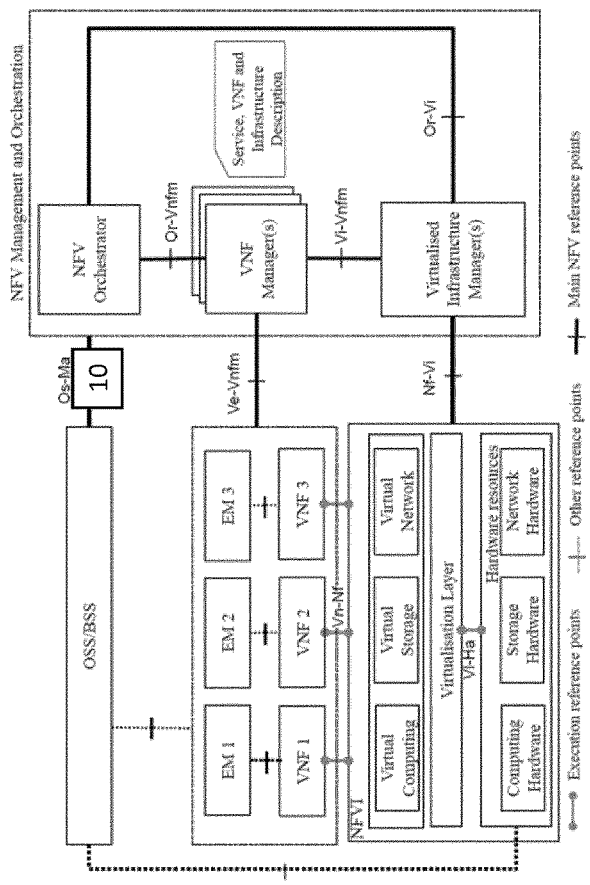
FIG. 5 schematically shows a network diagram including a service request enhancement device in accordance with the invention.

An exemplary NFV (network function virtualization) management and orchestration architecture is schematically shown in FIG. 5. This architecture is based upon ETSI GS NFV 002 V1.2.1 (2014 December), Network Functions Virtualization (NFV); Architectural Framework.

The management and orchestration architecture of FIG. 5 is shown to have several interfaces between the Operations Support System/Business Support System (OSS/BSS), the NFV Infrastructure (NFVI), and the VNF-NFV Infrastructure (Vn-Nf) on the one hand and the NFV (network function virtualization) management and orchestration (MN&O) on the other hand: a first OS-Ma interface, a second Ve-Vnfm interface, and a third Ng-Vi interface. Element managers (EMs) and virtual network functions (VNFs) are part of the Vn-Nf of the architecture, while a NFV Orchestrator, one or more VNF managers and one or more virtualized infrastructure managers are part of the MN&O. In accordance with the invention, the NSRE 10 is preferably located between the OSS/BSS and the MN&O, as schematically illustrated in FIG. 5. The NSRE 10 may also be regarded as a part of the OSS/BSS functionality. However, the NSRE 10 may also be placed in other parts of the network between the client and the MN&O, and even in a user device used by the client to provide the service request.

Figure 6:
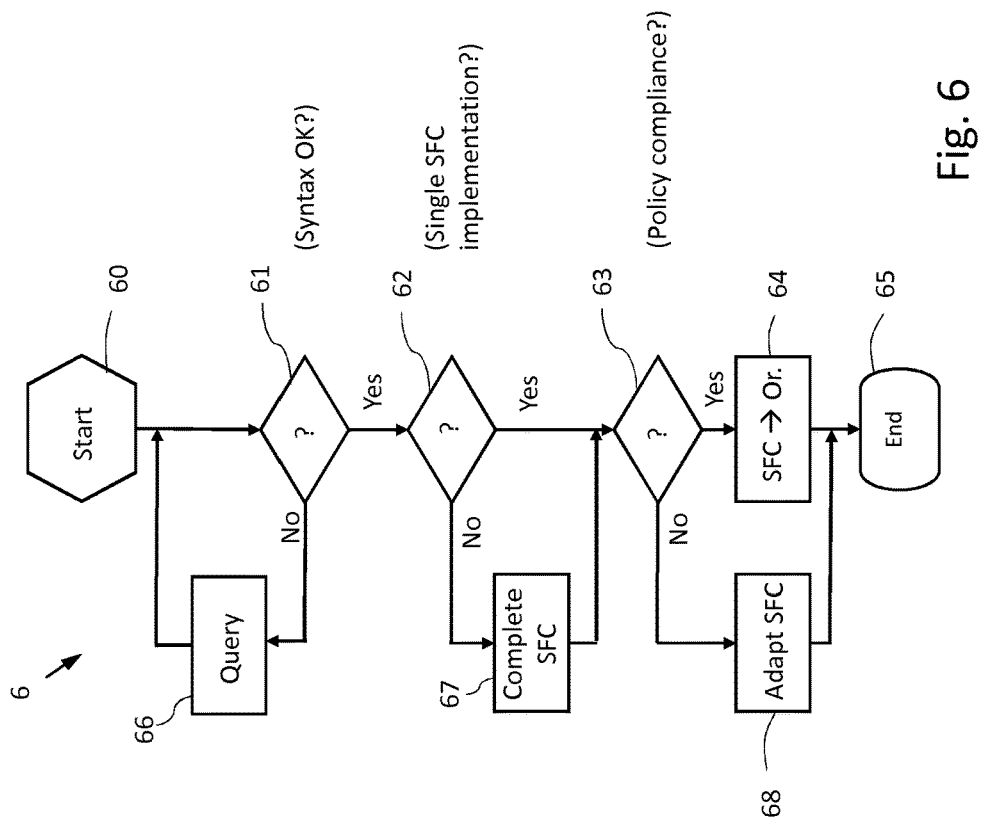
FIG. 6 schematically shows an exemplary embodiment of a method of enhancing service requests in accordance with the invention.

An exemplary embodiment of a method of enhancing service requests in accordance with the invention is schematically illustrated in FIG. 6. The exemplary method 6 comprises an initial step 60 in which the method is initiated and a service request (SR), in the present case an SFC request, may be received. In the first step 61, it is checked whether the syntax of the SFC request is correct. This means that it is checked whether the SFC request can in principle be parsed by an MN&O of the type that is being used in the network, for instance whether the SFC request is written in the right language and with the right template. If the syntax of the SFC request is correct ("Yes"), the method continues with the second step 62. If not ("No"), the method continues with step 66 in which a correct SFC request is constructed by first performing a keyword analysis on the service request and retrieving matching SFC request parts (typically so-called "snippets": single virtual network functions or sets of virtual network functions related by a forwarding graph) from a storage unit, such as the storage unit 20 in FIG. 3. The storage unit contains a sufficiently large set of snippets identifiable by using information available in or concerning SFCs, such as client identity, time, application identity, network identity, service identity, device identity, etc. If the information present in the service request is not sufficient to construct a valid SFC request, the entity (typically a client) that produced the service request is queried about additional information regarding the service request. The method then returns to step 61.

In step 62, it is checked whether the SFC request allows a single implementation, that is, whether the SFC request can be interpreted unambiguously by the MN&O. If this is the case ("Yes"), the method continues with the third step 63.

If not ("No"), for example because the SFC request is ambiguous, then the method continues with step 67 in which the SFC request is completed. Step 67 may comprise substeps in which missing information is detected. Matching SFC snippets are retrieved from a storage unit, such as the database storage unit 20 in FIG. 3, so as to complete the SFC request. If the NSRE does not have enough information or intelligence to determine whether the SFC request is unambiguous, it may request the MN&O to analyze the SFC request on behalf of the NSRE, and provide the NSRE with an answer. When the SFC request has been completed, the method continues with the third step 63.

In step 63, it is checked whether the SFC request complies with a policy. As described with reference to FIG. 4, policies may include static policies (default configurations of parts of the service request based on customer information, customer type information, network identity, application identity, etc.), dynamic policies (configurations based on the time of receiving the service request and monitoring information received from the MN&O or other monitoring entities in the network), history-based policies (configurations based on interpretation and extrapolation of historic information), and externality-based policies (configurations depending on information from external sources, for instance sources providing planning and forecasting information).

If the SFC request complies with a policy ("Yes"), the method continues with step 64, in which the SFC is passed on, for example to the NFV management and orchestration function (see FIG. 5) or to the NRAS (see FIG. 2), and the method ends (65). If not ("No"), the method continues with step 68 in which the SFC request is adapted, again using snippets from a storage unit, such as the storage unit 20 in FIG. 3, so as to comply with the applicable policies, after which the method ends (65).

The invention further allows network resources to be allocated to a network service in a flexible manner. More in particular, the invention allows conditional resource allocations to be specified in service requests, in addition to conventional unconditional resource allocations. Depending on one or more conditions, the conditional allocations may be made unconditional or may be cancelled.

Figure 7:
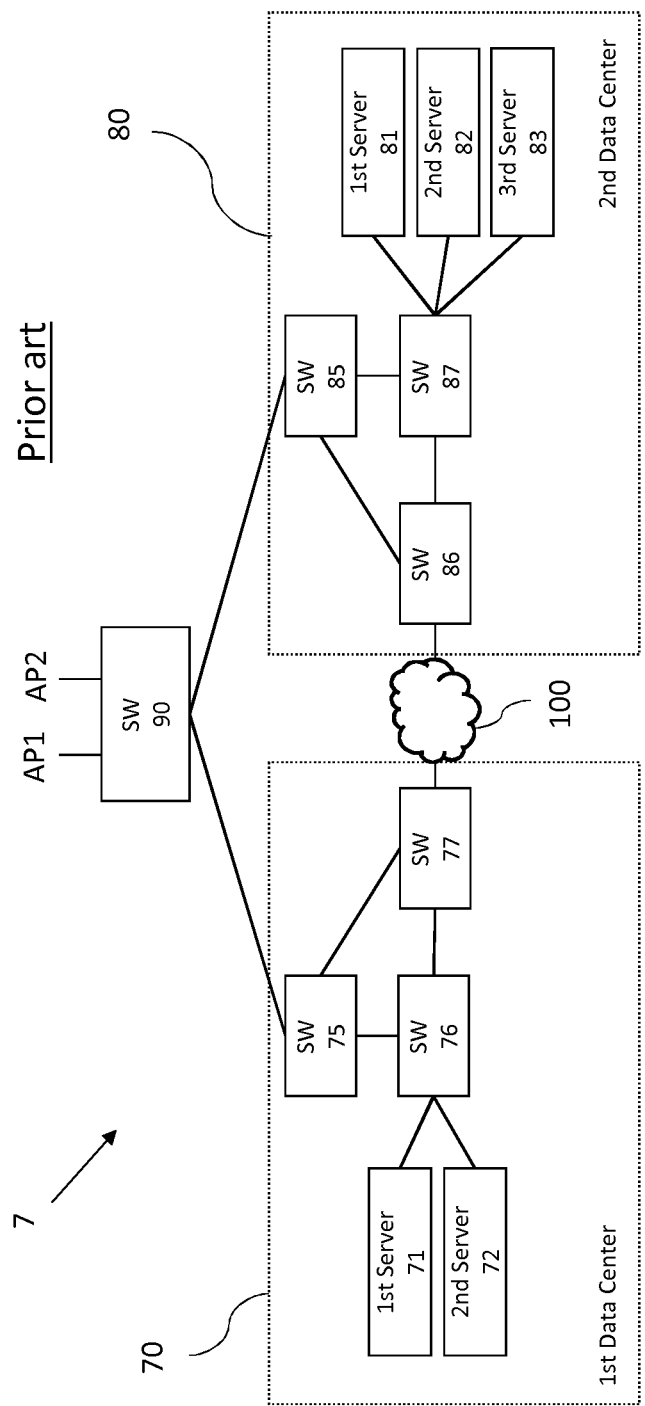
FIG. 7 schematically shows an example of a communication system according to the prior art.

The prior art communication system 7 schematically illustrated in FIG. 7 comprises a first data centre 70, a second data centre 80, a switch (SW) 90, and a network 100. The first data centre 70 comprises a first server 71 and the second server 72, as well as switches 75, 76 and 77 connecting the servers 71 and 72 with the switch 90 and the network 100. Similarly, the second data centre 80 comprises a first server 81, a second server 82 and a third server 83. The second data centre 80 further comprises three switches 85, 86 and 87 connecting the servers 81-83 with the switch 90 and the network 100. The switch 90 connects the communication system 7 with two access points of a service: access points AP1 and AP2.

In the example shown, each server 71, 72 of the first data centre 70 is capable of hosting two virtual network functions (VNFs) while the servers 81, 82 and 83 of the second data centre 80 are also capable of hosting two virtual network functions each. The network 100 connecting the two data centres has, in the present example, a relatively large latency.

If a firewall service has to be implemented in the system 7, and if that firewall service requires three virtual network functions (VNFs), the network operator might allocate all three virtual network functions to the servers of the first data centre 70. As mentioned above, each server is capable of hosting two virtual network functions. However, if it is later decided that more than three virtual network functions are needed, for example five in total, then at least one of those virtual network functions has to be accommodated in one of the servers of the second data centre 80. This has the disadvantage that servers hosting the same function are now separated by a network (100) having a relatively high latency. It would have been better to accommodate all five virtual network functions in the servers of the second data centre 80, but migrating the first three virtual network functions from the first datacentre 70 to the second datacentre 80 is typically very inconvenient and may cause an interruption of the service. The present invention offers a solution for this problem by providing conditional allocations of network resources, as will later be explained below.

Figure 8:
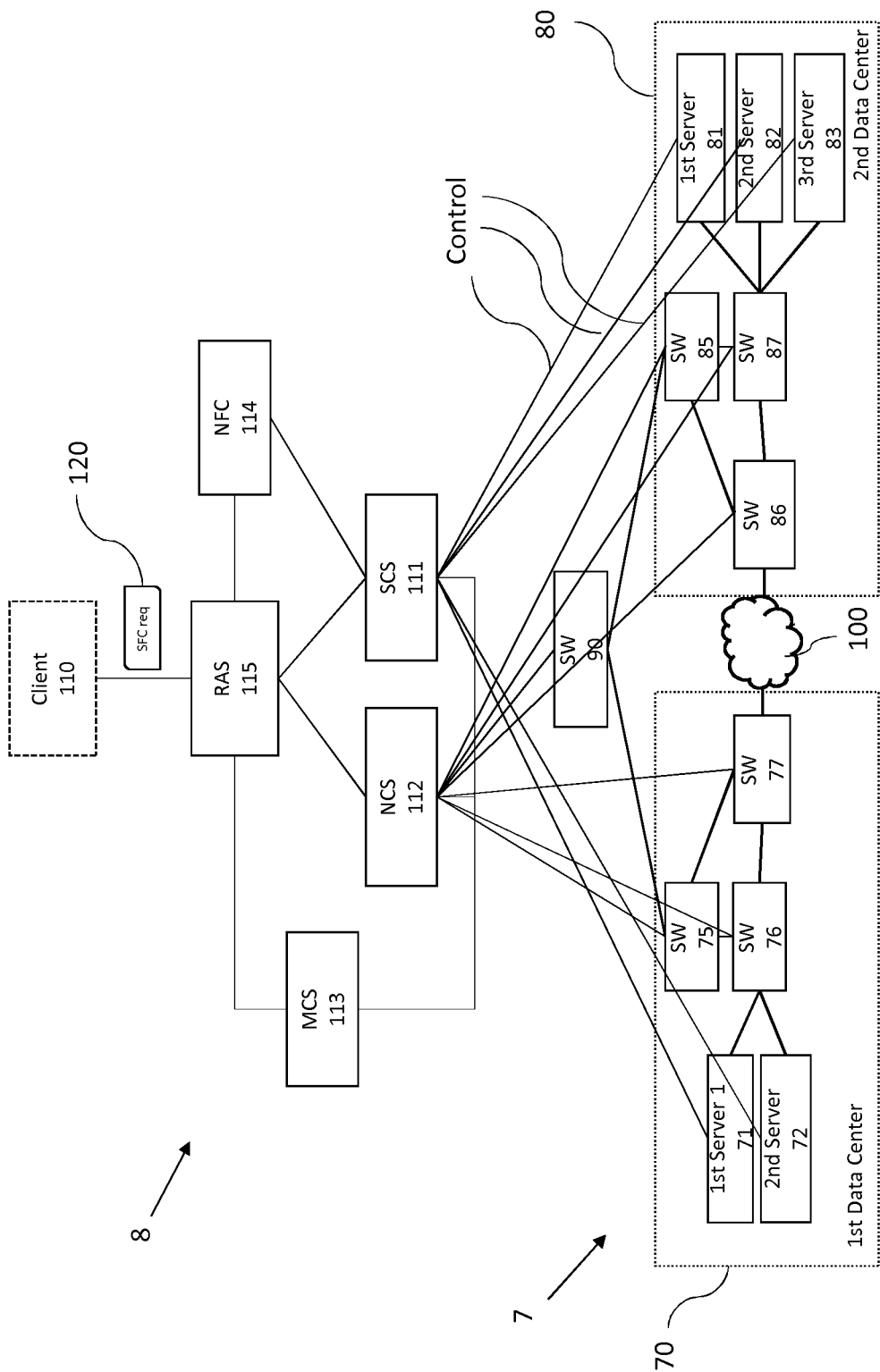
FIG. 8 schematically shows the communication system of FIG. 7 coupled with a first embodiment of a resource management system according to the invention.

FIG. 8 schematically shows a resource management system 8 according to a first embodiment of the invention, which resource management system 8 is coupled with the communication system 7 of FIG. 7. A resource management system similar to the system of FIG. 8 is disclosed in ETSI Group Specification "Network Function Virtualization (NFV) Management and Orchestration" (ETSI GS NFV-MAN 001 V1.1., see http://www.etsi.org/deliver/etsi_gs/NFV-MAN/001_099/001/01.01.01_60/gs_nfv-man001v010101p.pdf).

The exemplary resource management system 4 illustrated in FIG. 8 comprises a server control system (SCS) 111, a network control system (NCS) 112, a monitoring control system (MCS) 113, a network function catalogue (NFC) 114 and a resource allocation system (RAS) 115. The server control system 111 is connected with the servers 71, 72, and 81-83, while the network control system 112 is connected with the switches 75-77 and 85-87, to control the servers and the switches respectively. One or more clients 110 may be connected with the resource allocation system 115. The server control system (SCS) 111 may also be referred to as virtual infrastructure manager (VIM), while the resource allocation system 115 may also be referred to as network function virtualization orchestrator (NFVO).

The Resource Allocation System (RAS) 115 is configured to handle service requests, such as SFC (Service Function Chain) requests 120 from clients 110, for example application providers. The RAS 115 is responsible for allocating elements of the service requests to physical infrastructure, for example mapping virtual network functions (VNFs) onto virtual machines (VMs) on server hardware, and VNF links to network paths, as well as instructing appropriate control infrastructure to deploy service components on allocated resources. In order to be able to perform this allocation, the RAS 115 has a global resource topology view including both network and server resources as gathered from interactions with infrastructure control systems. The RAS maintains this database by accounting for deployed services and, in accordance with the invention, accounting for conditional resource allocations, which may also be referred to as resource reservations.

In accordance with the invention, conditional service request specification attributes can be added to a service function chain (SFC) specification. In embodiments of the invention, such conditional service request specification attributes can be added in the indirect part of a service request, while the direct part of a service request can comprise unconditional service request specification attributes. In embodiments of the invention, the RAS 115 is adapted to take conditional service requests into account. The RAS 115 is not only configured to instruct the NCS 112 and SCS 111 to unconditionally deploy services specified in the direct part of a service request, but is in accordance with the invention also configured to conditionally allocate (which may also be referred to as pre-allocate) resources in response to the indirect part of a service request.

It is noted that the number of resources conditionally allocated may not be identical to the number of resources specified in the indirect part. The number of resources conditionally allocated may depend on the conditions, the likelihood of those conditions being fulfilled, and the availably of resources, for example. This likelihood of the conditions being fulfilled may be included in the (indirect part of the) service request, may be retrieved from a database where conditions and their associated likelihoods are stored, or may be calculated from stored data and/or data included in the service request.

In response to the indirect part of a service request, the RAS 115 may instruct the units of the communication system 7 to pre-configure forwarding rules and/or pre-configure virtual machine (VM) configurations, without giving the client access to these forwarding rules or VM configurations until certain conditions are fulfilled. Additionally, or alternatively, the RAS 115 may block a certain amount of resources until certain conditions are fulfilled.

Subsequently, the RAS 115 can provide the client that issued the service request with references to the conditionally allocated resources. Those references may be referred to as tentative resource identifications (TRIDs).

The Network Control System (NCS) 112 is responsible for setting up network paths in order to implement VNF links of SFCs. The Server Control System (SCS) 111 is responsible for deploying the specified VMs on selected server resources.

The network function catalogue (NFC) 114 is responsible for storing network function (NF) types, their specification in the form of a deployable virtual machine (VM) image, or code which can be compiled and run within a virtualization environment, as well as the required deployment actions/script.

The monitoring control system (MCS) 113 is configured for monitoring network functions, monitoring (at least parts of) the network, and/or for monitoring service function chains with respect to certain metrics. Suitable metrics which may be monitored by the MCS 113 are CPU (central processing unit) load of network functions, and packet loss and/or packet delay in the network paths or the service function chains. The monitoring control system 113 may interact with individual network functions, or with control systems controlling the service function chains, such as the network control system (NCS) 112, the server control system (SCS) 111 or the resource allocation system (RAS) 115.

Figure 9:
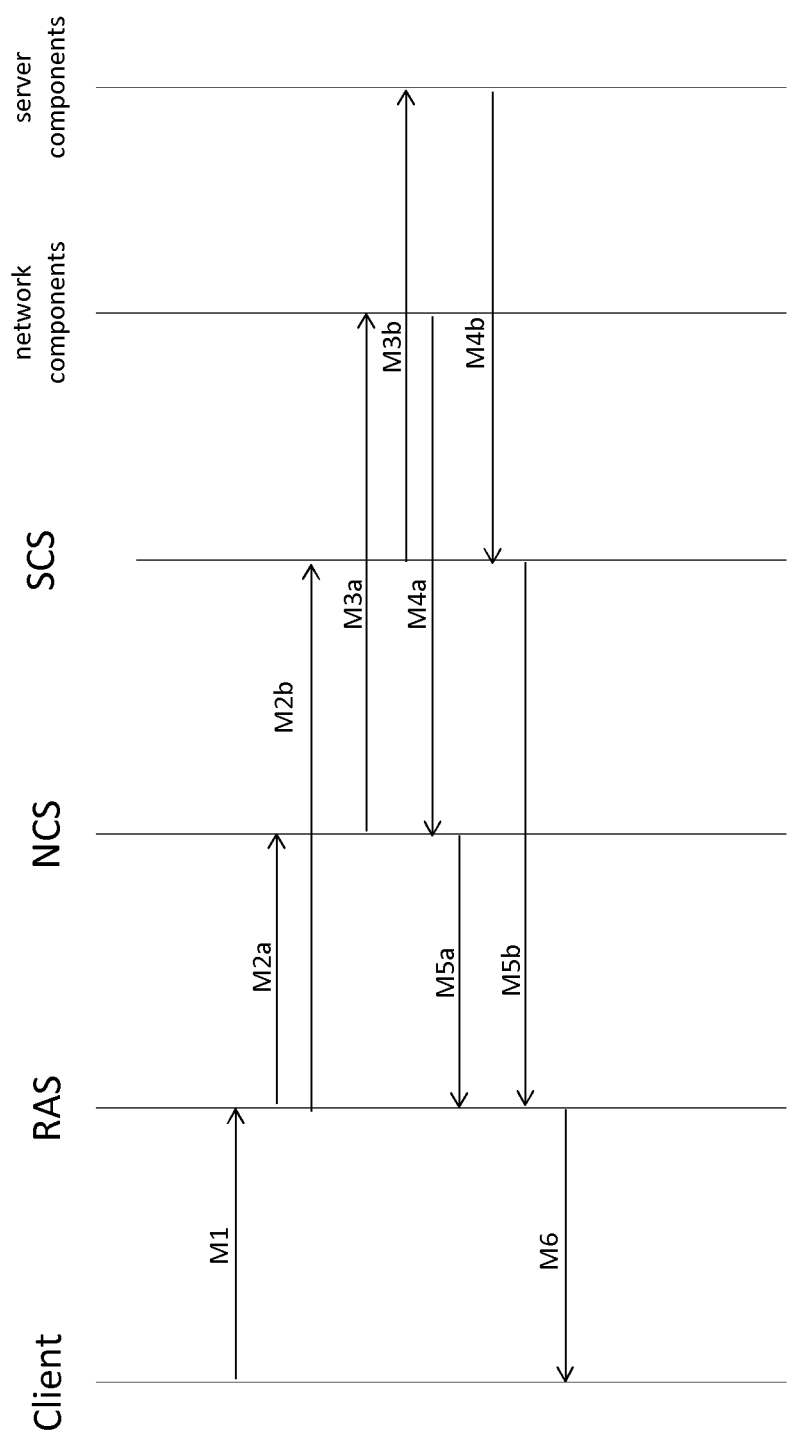
FIG. 9 schematically shows an exemplary data exchange between elements of the communication system and the resource management system of FIG. 8.

An exemplary information flow between the elements of the resource management system 8 and the communication system 7 of FIG. 8 is schematically illustrated in FIG. 9.

The client 110 sends a first message M1, a service request, to the RAS 115. The service request may have the form of a SFC (Service Function Chain) specification. Then the RAS 115 performs resource allocation, choosing appropriate network and server resources to deploy link connectivity (for example VNF connectivity) and VNFs as specified in the service request. Subsequently, the RAS 115 instructs particular resource controllers in two messages: in message M2a the NCS 112 is instructed to set up appropriate network paths between specified network points, while in message M2b the SCS 111 is instructed to deploy virtual machines (VMs) on selected server nodes. Deployment information is fetched from the NFC 114.

In message 3a, the NCS 112 triggers network switches to install appropriate forwarding and/or encapsulation rules, while in message 3b the SCS 111 triggers the server components to create VMs and deploy appropriate images. In messages 4a and 4b, the network components and the server components report the result of their actions to the NCS 112 and the SCS 111 respectively.

The infrastructure controllers NCS and SCS aggregate the received information and send the aggregated information towards the orchestrating RAS 115 in messages M5a and M5b respectively. The RAS 115 can consolidate information of instantiated resources and informs the client 110, by using a message M6, about the unique instance identifiers (Instantiated Resource ID) of the network elements (VNF links and VNFs) and how to access them.

Although the arrangement of FIG. 9 is suitable for allocating resources in response to service requests, it is only capable of allocating resources on the basis of present requirements. In other words, it is incapable of taking future requirements into account. The present invention solves this problem by providing service requests which allow specifying a conditional allocation of network resources. An embodiment of these modified service requests will later be explained with reference to FIG. 12. First, a resource management system and its associated information flow will be explained with reference to FIGS. 10 and 11.

Figure 10:
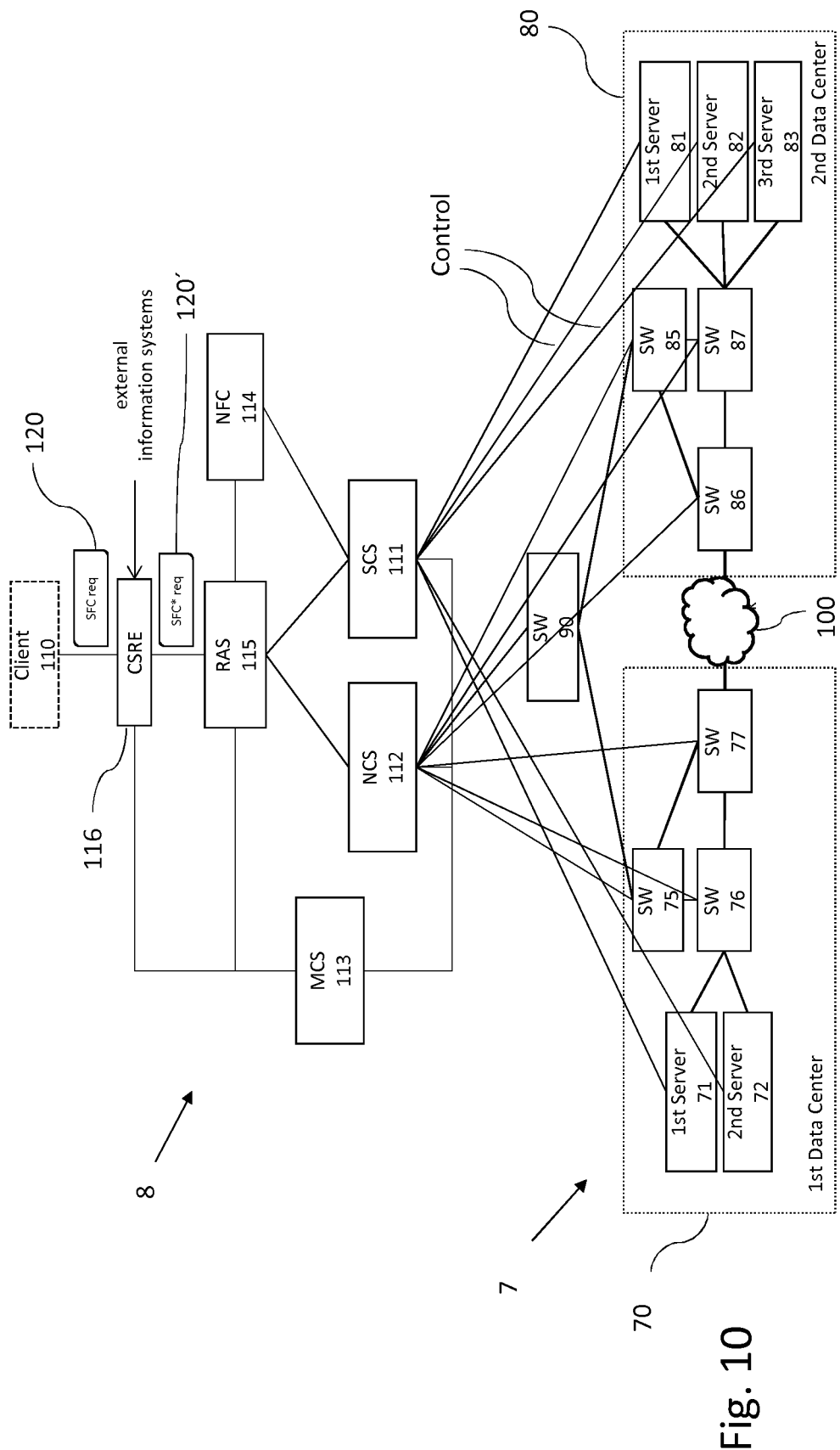
FIG. 10 schematically shows the communication system of FIG. 7 coupled with a second embodiment of a resource management system according to the invention.

The exemplary second embodiment of a resource management system 8 according to the invention which is illustrated in FIG. 10 also comprises a server control system (SCS) 111, a network control system (NCS) 112, a monitoring control system (MCS) 113, a network function catalogue (NFC) 114 and a resource allocation system (RAS) 115. As in the embodiment of FIG. 8, the server control system 111 can be connected with the servers 71, 72, and 81-83, while the network control system 112 is connected with the switches 75-77 and 85-87, to control the servers and the switches respectively.

However, in contrast to the embodiment of FIG. 8, the embodiment of FIG. 10 further comprises a Conditional Service Request Estimator (CSRE) 116. The Conditional Service Request Estimator (CSRE) may be an embodiment of the network service request enhancer (NSRE). In the embodiment shown, the CSRE 116 is positioned between the client 110 and the resource allocation system (RAS) 115 of the service provider (for example a network function virtualization provider). Its main role is to mediate between the client 110 and the RAS 115, both by augmenting or adapting service requests and by providing responses with respect to information relating to the indirect (that is, conditional) part of service requests. The conditional service request estimator (CSRE) 116 converts a service request, such as an SFC request 120, into a modified service request, such as the SFC request 120' shown in FIG. 10. To this end, the CSRE 116 uses information which may be supplied by external information systems such as databases. In this embodiment, the CSRE 116 is transparent to the unconditional, direct part of service requests but is capable of modifying the conditional, indirect part of service requests.

The Conditional Service Request Estimator (CSRE) 116 is configured to mediate between the client 110 and the RAS 115 by modifying service requests in response to information such as:
  historical data (use of a service in the past),
  service monitoring data (use of a service in the present), and/or
  external data (for example the weather, which may influence the use of certain services).

In addition to modifying service requests, the CSRE 116 may also be configured for producing service requests in response to the above or other information.

Through interaction with the MCS 113, the CSRE 116 may build a model of a service so as to be able to predict future use of the service. The CSRE may, for example, correlate an increase in network and resource usage with service change requests for additional services. Once the CSRE has established this relationship, the CSRE may either (a) produce service requests to increase the resources which are (conditionally and/or unconditionally) allocated to a service (automatic resource scaling), or (b) insert indirect parts into (future) service requests for the particular service to increase the conditionally allocated resources, or (c) modify indirect parts of (future) service requests for the particular service to increase the conditionally allocated resources.

External data may be received from external information systems, such as databases containing both past weather data and past service use data, thus making it possible to determine a likelihood of a service being used under certain weather conditions.

Figure 11:
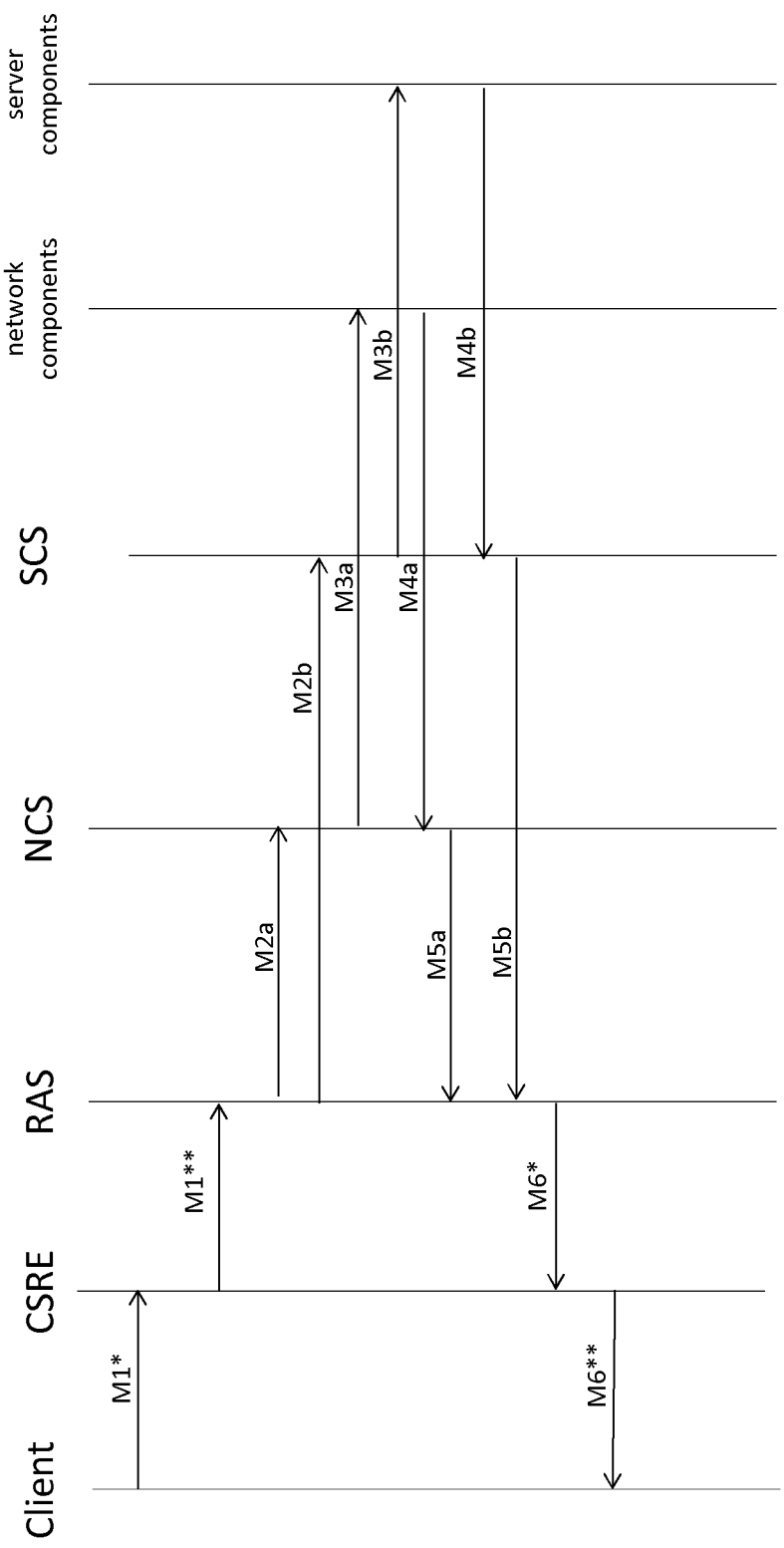
FIG. 11 schematically shows an exemplary data exchange between elements of the communication system and the resource management system of FIG. 10.

The information flow in the arrangement of FIG. 10 is schematically illustrated in FIG. 11. The information flow of FIG. 11 is similar to the one of FIG. 9, with the exception of the intervention of CSRE. Due to the presence of the CSRE 116, the message M1 is split into two messages M1* and M1**, the first message M1* being sent from the client 110 to the CSRE 116, and the second message M1** being sent from the CSRE 116 to the RAS 115. Similarly, the sixth message M6 is split into messages M6* and M6**, the first message M6* being sent from the RAS to the CSRE and the second message M6** being sent from the CSRE to the client.

The information flow illustrated in FIG. 11 is applicable to two embodiments which may be combined into a single embodiment. In a first embodiment, the CSRE adds indirect service parts to the original service request of client 110. These additional indirect service parts may be based upon a predictive model of the requested service. Using a predictive model, the CSRE can prepare the RAS for a potential increase in required resources in the near future. In a second embodiment, the CSRE may produce a service request itself in anticipation of a service request from the client 110. This embodiment allows certain triggers (which may be derived from interactions between the CSRE 116 and the MCS 113) to cause the CSRE 116 to request additional resources (which may or may not already be conditionally allocated).

Figures 12, 13:
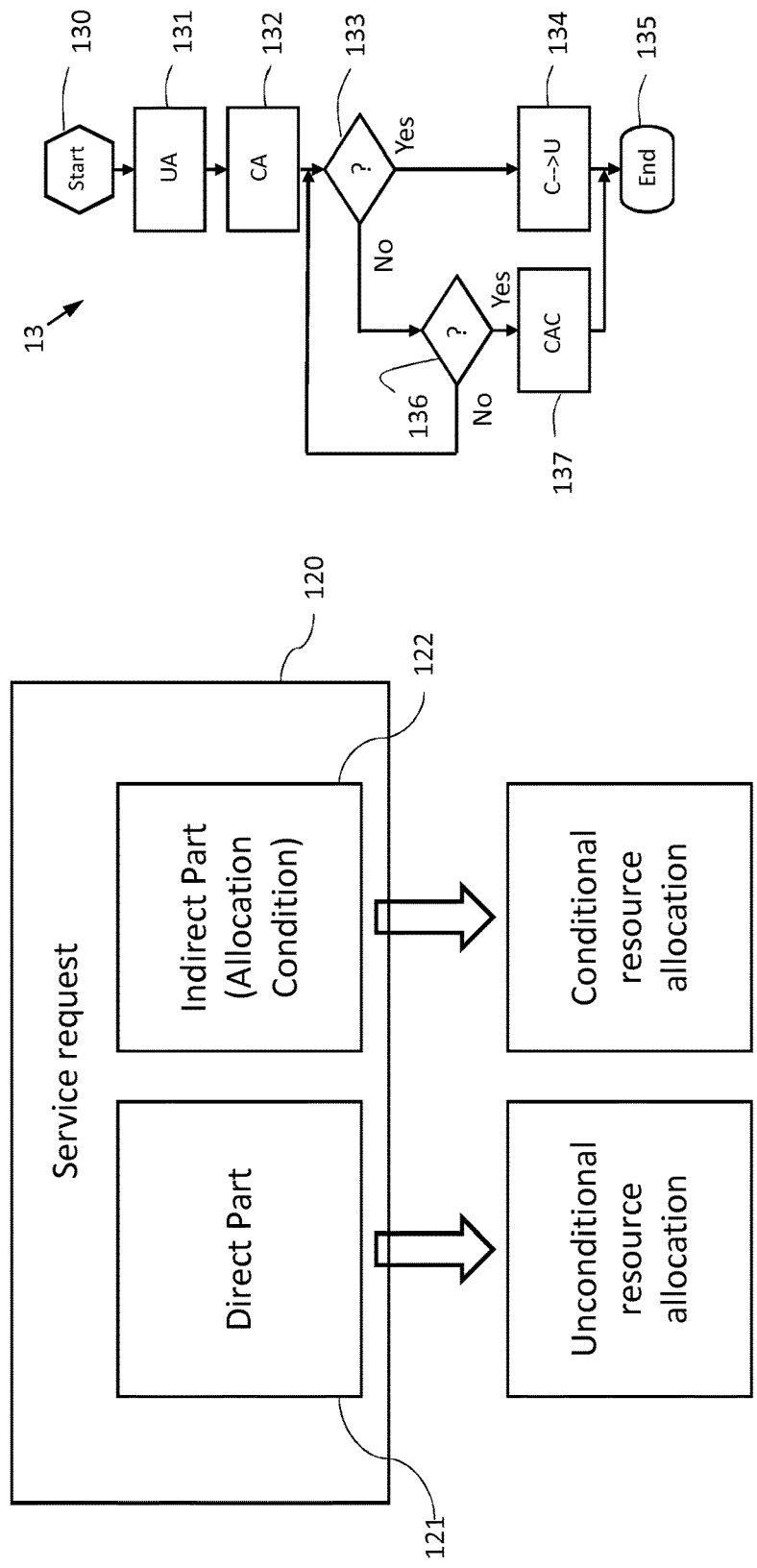
FIG. 12 schematically shows an embodiment of a service request according to the present invention.
FIG. 13 schematically shows a method of allocating network resources according to the present invention.

An embodiment of a service request according to the present invention is schematically illustrated in FIG. 12. The exemplary service request 120 is shown to comprise a direct part 121 and an indirect part 122. The direct part 121 can correspond with (part of) a service request according to the prior art and specifies one or more unconditional resource allocations which can be carried out directly. The indirect part 122, in contrast, specifies one or more conditional resource allocations which cannot be carried out directly. These conditional allocations are only carried out when an allocation condition is fulfilled. Suitable conditions can be a time limit having expired, a threshold value being exceeded, etc.

Although the service request 120 of FIG. 12 is shown to contain two parts, a direct part and an indirect part, one of these parts may be empty or absent. In some embodiments, therefore, some service requests may only contain an indirect part, while other service requests only contain a direct part. It will be clear that service requests only containing a direct part are equivalent, and possibly identical, to service requests of the prior art.

It will be understood that the service request 120 may contain additional information relating to the type of service requested, the amount of resources required, and/or other information.

An exemplary embodiment of the method of allocating network resources in accordance with the present invention is schematically illustrated in FIG. 13. The method may be carried out by the resource management system 8 of FIG. 10.

The method 13 of FIG. 13 comprises an initial step 130, in which the method is initiated and a service request is received from a client. In a first step 131, one or more network resources are unconditionally allocated (UA) to a network service in response to a direct part of the service request. In a second step 132, one or more network resources are conditionally allocated (CA) to the network service in response to an indirect part of the service request. Although the steps 131 and 132 are shown in FIG. 13 as consecutive steps, they may also be carried out in parallel, that is, substantially simultaneously.

In the next step 133, it is checked whether a threshold value of the allocation condition is exceeded (in the present example it is assumed that exceeding the threshold value implies fulfilling the allocation condition). If the allocation condition is fulfilled (Yes), then the method continues with step 134 in which the conditional allocation becomes unconditional (C->U). the method then ends in step 135.

If the allocation condition is not fulfilled (No) by exceeding the threshold, then the method continues with step 136 in which it is checked whether a time limit (which may also be part of an allocation condition) is exceeded. If the time limit is exceeded (Yes), then the method continues with step 137 in which the conditional allocation is cancelled (CAC). Subsequently, the method ends in step 135. If the time limit is not exceeded (No), then the method returns to step 133. It will be understood that other embodiments of the method are also possible.

Figure 14:
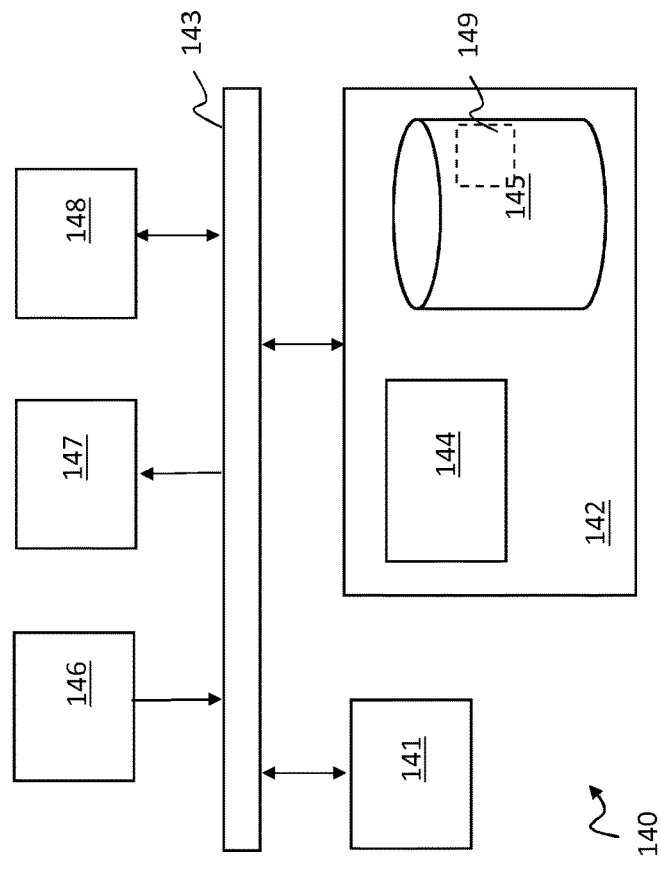
FIG. 14 schematically shows a block diagram of a general system to be employed in the disclosed method.

FIG. 14 is a block diagram illustrating an exemplary data processing system that may be used as a part of a user equipment or as a network node, such as base station.

Data processing system 140 may include at least one processor 141 coupled to memory elements 142 through a system bus 143. As such, the data processing system 140 may store program code within memory elements 142. Further, processor 141 may execute the program code accessed from memory elements 142 via system bus 143. In one aspect, data processing system 140 may be implemented as a computer that is suitable for storing and/or executing program code. It should be appreciated, however, that data processing system 140 may be implemented in the form of any system including a processor and memory that is capable of performing the functions described within this specification.

Memory elements 142 may include one or more physical memory devices such as, for example, local memory 144 and one or more bulk storage devices 145. Local memory may refer to random access memory or other non-persistent memory device(s) generally used during actual execution of the program code. A bulk storage device 145 may be implemented as a hard drive or other persistent data storage device. The data processing system 140 may also include one or more cache memories (not shown) that provide temporary storage of at least some program code in order to reduce the number of times program code must be retrieved from bulk storage device 145 during execution.

Input/output (I/O) devices depicted as input device 146 and output device 147 optionally can be coupled to the data processing system 140. Examples of input devices may include, but are not limited to, for example, a keyboard, a pointing device such as a mouse, a touchscreen, or the like. Examples of output device may include, but are not limited to, for example, a monitor or display, speakers, or the like. Input device 146 and/or output device 147 may be coupled to data processing system 140 either directly or through intervening I/O controllers. A network adapter 148 may also be coupled to data processing system 140 to enable it to become coupled to other systems, computer systems, remote network devices, and/or remote storage devices through intervening private or public networks. The network adapter 148 may comprise a data receiver for receiving data that is transmitted by said systems, devices and/or networks to said data processing system 140 and a data transmitter for transmitting data to said systems, devices and/or networks. Modems, cable modems, and Ethernet cards are examples of different types of network adapters that may be used with data processing system 140.

As pictured in FIG. 14, memory elements 142 may store an application 149. It should be appreciated that data processing system 140 may further execute an operating system (not shown) that can facilitate execution of the application. Applications implemented in the form of executable program code can be executed by data processing system 140, for example, by processor 141. Responsive to executing the application 149, the data processing system 140 may be configured to perform one or more operation as disclosed in the present application in further detail.

In one aspect, for example, data processing system 140 may represent a multipoint transmission control system MTC or a user device UE. In that case, application 149 may represent a client application that, when executed, configures data processing system 140 to perform the various functions described herein with reference to an MTC or a user equipment. Examples of an MTC include a base station of a telecommunications network providing cellular wireless access, for example a NodeB or an eNB. The user equipment can include, but is not limited to, a personal computer, a portable computer, a mobile phone, or the like.

In another aspect, data processing system 140 may represent a transmission node TN as described herein, in which case application 149, when executed, may configure data processing system 140 to perform operations as described in the present disclosure.

Figure 15:
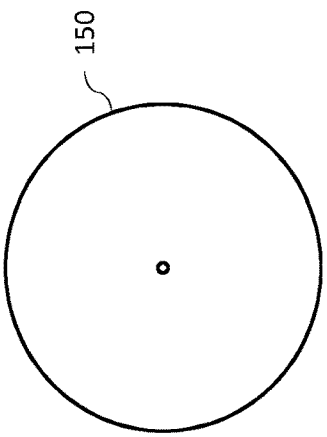
FIG. 15 schematically shows a software program product allowing a processor to carry out the method according to the present invention.

The software program product 150 schematically illustrated in FIG. 15 comprises a tangible carrier, such as a DVD, on which a software program is registered which contains instructions allowing a processor to carry out embodiments of the method of the present invention. It is noted that such a software program may also be available for download from a server, for example via the internet. Alternatively, or additionally, the software program may be able to run remotely on a server.

As will be appreciated by one skilled in the art, aspects of the present invention may be embodied as a system, method or computer program product. Accordingly, aspects of the present invention may take the form of an entirely hardware embodiment, a software embodiment (including firmware, resident software, micro-code, etc.) or an embodiment combining software and hardware aspects that may all generally be referred to herein as a "circuit," "module" or "system". Functions described in this disclosure may be implemented as an algorithm executed by a microprocessor of a computer. Furthermore, aspects of the present invention may take the form of a computer program product embodied in one or more computer readable medium(s) having computer readable program code embodied, for example, stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a solid-state drive, a random access memory (RAM), a non-volatile memory device, a read-only memory (ROM), an erasable programmable read-only memory (EPROM or Flash memory), an optical fibre, a portable compact disc read-only memory (CD-ROM), an optical storage device, a magnetic storage device, or any suitable combination of the foregoing. In the context of this disclosure, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless (using electromagnetic and/or optical radiation), wired, optical fibre, cable, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on a user's computer, partly on the users computer, as a stand-alone software package, partly on the users computer and partly on a remote computer, or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the functions noted in the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It will be understood that the description of the invention given above is not intended to limit the invention in any way. Singular nouns and the articles "a" and "an" are of course not meant to exclude the possibility of plurals. Devices mentioned in this document may be replaced with their successors, even if these successors are not yet known at the time of writing. As is well established in the law of patents, the abstract should never be used to limit the scope of the claims, and neither should reference numbers in the claims.

It will further be understood by those skilled in the art that the present invention is not limited to the embodiments mentioned above and that many additions and modifications are possible without departing from the scope of the invention as defined in the appending claims.

The invention claimed is:

1. A method of allocating network resources to a network service in a communication network,
   wherein the communication network comprises network resources capable of providing a network service specified in a service request issued by a client,
   wherein the service request comprises a direct part and an indirect part, and
   wherein the indirect part comprises network resources for future use and at least one allocation condition,
   the method comprising:
   unconditionally allocating, in response to the direct part of the service request, one or more network resources for deploying the network service, wherein unconditionally allocated network resources are prevented from being unconditionally or conditionally allocated to another network service,
   conditionally allocating, in response to the indirect part of the service request, one or more additional network resources to the network service, wherein conditionally allocated network resources are capable of being unconditionally allocated to the network service in response to the direct part of a further service request of the client and are available for allocation to another network service depending on the at least one allocation condition, and
   deploying the network service on the unconditionally allocated network resources.

2. The method according to claim 1,
   wherein the allocation condition comprises a time limit.

3. The method according to claim 2, further comprising:
   allowing conditionally allocated network resources to be unconditionally or conditionally allocated to another network service after the time limit has expired.

4. The method according to claim 1,
   wherein the allocation condition comprises a threshold value.

5. The method according to claim 4, further comprising:
   unconditionally allocating conditionally allocated network resources to the network service if the threshold value is exceeded.

6. The method according to claim 1, further comprising:
   unconditionally allocating, in response to the direct part of the further service request received from the client, conditionally allocated network resources to the network service.

7. The method according to claim 1, further comprising:
   cancelling a conditional allocation in response to the direct part or the indirect part of a still further service request of the client.

8. The method according to claim 1,
   wherein the indirect part of a service request further comprises a likelihood of conditionally allocated network resources being unconditionally allocated within the time limit.

9. The method according to claim 8,
   wherein conditionally allocating additional network resources comprises determining an actual number or amount of network resources to be conditionally allocated in dependence of the likelihood.

10. The method according to claim 1, further comprising:
    providing the client with identifiers referring to conditionally allocated network resources.

11. A software program product comprising instructions allowing a processor to carry out all the steps of the method according to claim 1.

12. A device for allocating network resources to a network service in a communication network,
    wherein the communication network comprises network resources capable of providing network services specified in a service request issued by a client,
    wherein the service request comprises a direct part and an indirect part, and
    wherein the indirect part comprises network resources for future use and at least one allocation condition, the device having a processor configured for
unconditionally allocating, in response to the direct part of the service request, one or more network resources for deploying the network service, wherein unconditionally allocated network resources are prevented from being unconditionally or conditionally allocated to another network service,
conditionally allocating, in response to the indirect part of the service request, one or more additional network resources to the network service, wherein conditionally allocated network resources are capable of being unconditionally allocated to the network service in response to the direct part of a further service request of the client and are available for allocation to another network service depending on the at least one allocation condition, and
instructing control infrastructure to deploy the network service on the unconditionally allocated network resources.

13. A communication system comprising:
a communication network, and
an allocation device according to claim 12.

14. The communication system according to claim 13, wherein the network resources comprise virtual machines and/or bandwidth.

15. The communication system according to claim 13, further comprising:
a service request modification device configured for modifying the indirect part of the service request.

\* \* \* \* \*